Patented Oct. 2, 1928.

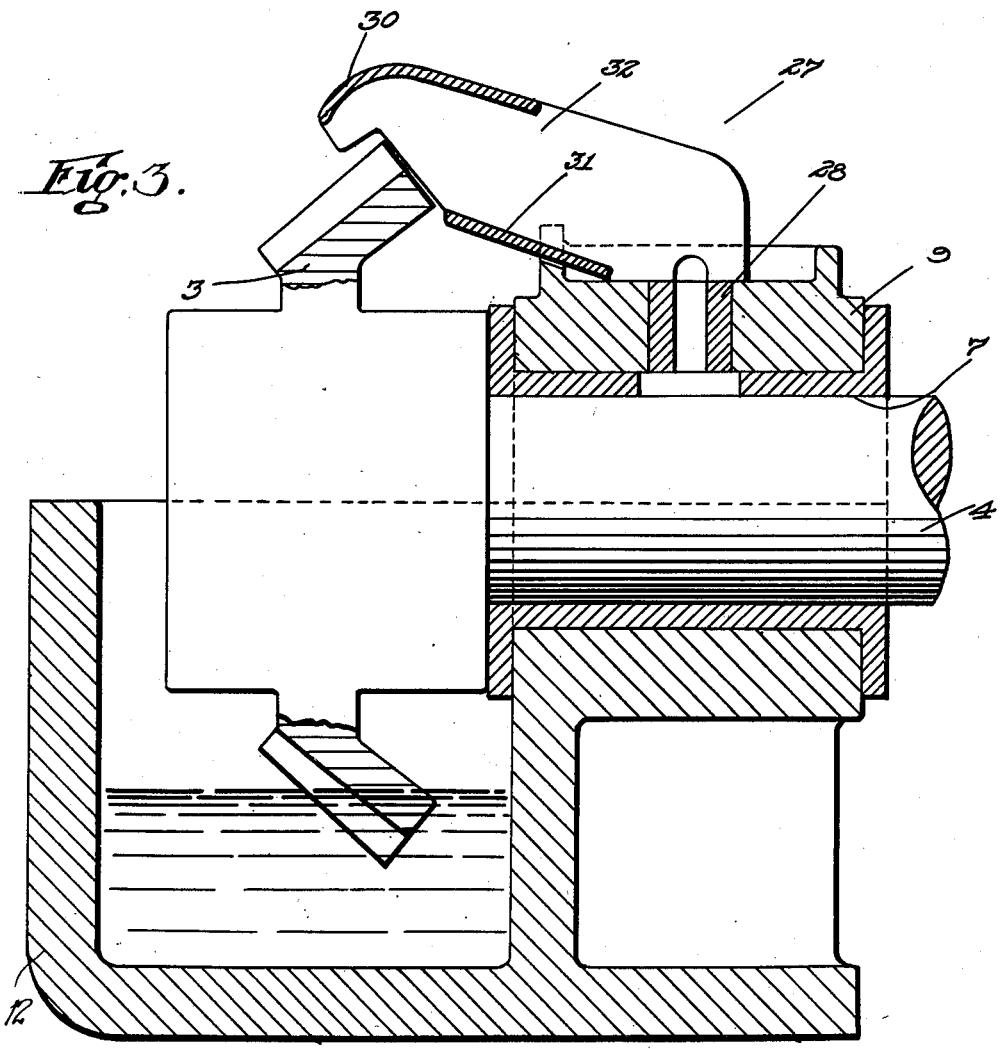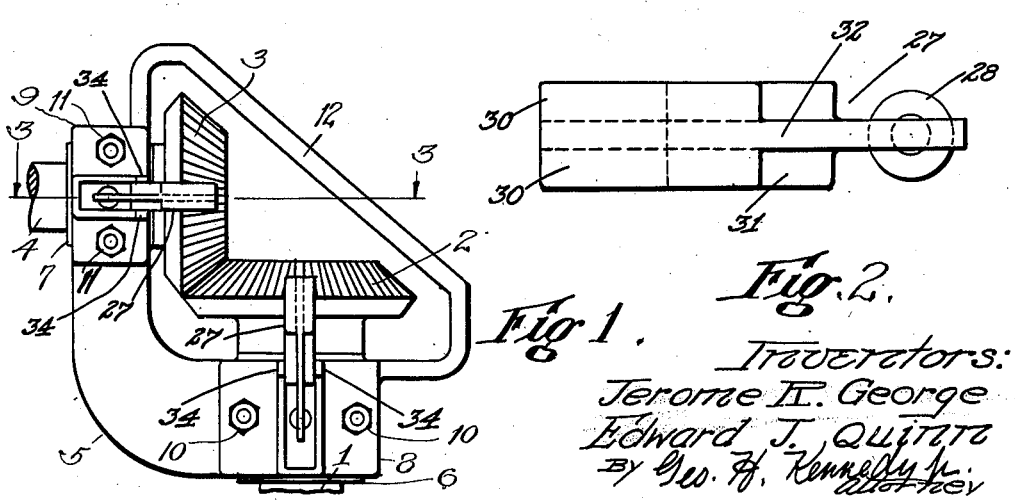

1,686,271

UNITED STATES PATENT OFFICE.

JEROME R. GEORGE AND EDWARD J. QUINN, OF WORCESTER, MASSACHUSETTS, ASSIGNORS TO MORGAN CONSTRUCTION COMPANY, OF WORCESTER, MASSACHUSETTS, A CORPORATION OF MASSACHUSETTS.

JOURNAL LUBRICATOR.

Application filed November 19, 1926. Serial No. 149,465.

The present invention relates to means for lubricating the journal bearings of shafting, and it utilizes the rotation in a bath of oil of a member carried by said shafting to achieve this object. The invention, therefore, finds its greatest usefulness in connection with the journals of shafts which carry gears and the like,—the construction herein shown being applicable to bevel gears.

According to the invention, the lower part of the gear is submerged in oil, which, adhering to the gear teeth and carried upwardly thereby, is delivered to the journal bearings of the gear shaft, thus providing the latter with a continuous supply of oil.

In the drawings,—

Fig. 1 is a plan view of a pair of intermeshing gears, provided with the device of the invention to deliver oil thrown off by them to the journals of their shafts.

Fig. 2 is a detached plan view of an oil delivering member.

Fig. 3 is a vertical sectional view on an enlarged scale taken on the line 3, 3 of Fig. 1.

Like reference characters refer to like parts in the different figures.

Referring to Fig. 1, a shaft 1 has secured thereto a bevel gear 2, which meshes with a bevel gear 3 on a second shaft 4. A member 5 provides journal bearings 6 and 7 for the shafts 1 and 4, respectively; said bearings providing the usual caps or covers 8 and 9, held in place by bolts 10, 10, and 11, 11.

The gears 2 and 3 rotate partially submerged in oil, the latter being contained in the bottom of a suitable housing 12. The oil thus adheres to the gears 2 and 3, and it is proposed by the present invention to collect oil thrown centrifugally from the gears and also to remove such oil from the non-meshing portions of said gears where no lubrication is required, and to deliver such oil continuously to the bearings 6 and 7.

Referring particularly to Figs. 2 and 3, a member 27 which, by means of a cylindrical plug portion 28 is detachably held by the bearing cap 9 of the journal 7, has a portion 30 overhanging the gear 3. Said portion 30 is connected to an inclined portion 31 by means of a vertical central flange 32. The position of the latter may be readily ascertained by comparing Figs. 2 and 3. The flange 32, besides spacing the portions 30 and 31, acts to collect the lubricant, which has a considerable horizontal velocity as it is tangentially thrown from the rotating gear, and desirably the flange 31 almost touches the non-meshing portion of the gear 3, thus collecting the film of oil that adheres to the gear. The collected oil finds its way by gravity to a hole 33 through the plug portion 28 and thus through the bearing cap, the inclined portion 31 serving to guide it there.

It will be noted that the collector 27 is detachable, that it may be used equally well with the gear rotating in either direction, and that the flange 32 may be easily adapted to the shape of the gear, or any suitably shaped rotating part whose lower portion is running in oil. Lugs 34—34 provided by the bearing caps hold the collectors 27 in place. See Fig. 1.

The invention functions to both scrape the oil carried on the surface of the gear or rotating member and catch a portion of the oil thrown tangentially by the rotating body and conduct the arrested fluid to a bearing.

We claim,

1. In a device for collecting lubricant tangentially thrown from a rotating member, a portion overhanging said rotating member and in the path of the flying lubricant, an inclined portion adapted to carry the collected lubricant by gravity to a journal, and a vertical flange connecting said portions, to take the impact of the lubricant.

2. In apparatus for collecting lubricant tangentially thrown from a rotating body, a single member detachably secured to a journal, a portion of said member overhanging said rotating body in the path of the flying lubricant, an inclined portion provided by said member adapted to carry the collected lubricant by gravity to said journal, and a vertical flange connecting said portions, to take the impact of the lubricant.

3. In apparatus for collecting lubricant tangentially thrown from a rotating body, a member to collect the lubricant, a plug portion provided by said member by which it is detachably secured to a journal, a portion of said member overhanging said rotating body in the path of the flying lubricant, an inclined portion provided by said member adapted to carry the collected lubricant by gravity to said journal, and a vertical flange connecting said portions to take the impact of the lubricant.

Dated this sixteenth day of November, 1926.

JEROME R. GEORGE.
EDWARD J. QUINN.